United States Patent Office 3,295,921
Patented Jan. 3, 1967

3,295,921
PRODUCTION OF HALIDES
Alan Edward Callow and Bernard Harris, Middlesbrough, England, assignors to British Titan Products Company Limited, Billingham, Durham County, England, a company of England
No Drawing. Filed Jan. 18, 1963, Ser. No. 252,287
Claims priority, application Great Britain, Jan. 24, 1962, 2,715/62
8 Claims. (Cl. 23—87)

The present invention relates to a process for the production of zirconium and silicon tetrahalides.

Zirconium tetrahalides are of value, for example, in the production of zirconia or in the production of zirconium metal. Zirconium tetrahalides are also of value as rutilising agents in the production of pigmentary titanium dioxide by the vapour phase oxidation of titanium tetrahalides.

Silicon tetrahalides are of value in the production of silica, particularly silica in a finely-divided form for use as a filler in elastomers such as rubber.

Sources of both zirconium and silicon tetrahalides are zirconia-silica materials, of which the most common is zircon. Zircon ($ZrSiO_4$) is a material which is readily and cheaply available in large quantities, for example as a by-product of other mining operations, and in a suitable form, i.e. small particles whose size is of the order of that of common sand.

It may be halogenated in the presence of a reducing agent to give equimolecular proportions of zirconium and silicon tetrahalides, but this is an unsatisfactory process giving poor yields and low halogen efficiencies.

For this reason, it has hitherto been found necessary, in the normal methods of preparing zirconium compounds, either first to convert zircon to zirconium cyanonitride by an electric furnace technique and then to chlorinate the zirconium cyanonitride to zirconium tetrachloride; or first to carry out alkaline extraction of zircon followed by precipitation of zirconia and then to chlorinate the zirconia to zirconium tetrachloride. Both these processes are complicated and expensive.

It is an object of the present invention to provide an improved and relatively cheap process for the halogenation of a zirconia-silica material such as zircon, whereby there may be achieved an improved yield and a high degree of efficiency (e.g. at least 90%) of halogen utilisation.

Accordingly, the present invention is a process for the production of zirconium and silicon tetrahalides comprising halogenating a zirconia-silica material in the presence of a reducing agent and an alkali metal halide, and thereafter recovering zirconium tetrahalide and silicon tetrahalide from the reaction gases.

Fluorine and fluorides are unsuitable for use in the present invention.

The preferred halogen is chlorine, although other halogens such as bromine or iodine may be suitable. The preferred alkali metal halide is a chloride, particularly potassium chloride. The zirconia-silica material is normally zircon, since zircon is the most readily available zirconia-silica material.

It is preferred to carry out the halogenation in a fluidised bed. The zirconia-silica material is then in the form of fluidizable particles, preferably of zircon.

In order to ensure halogenation the zirconia-silica material must of course be intimately contacted with a reducing agent. The preferred reducing agent is a finely-divided solid such as carbon, for example in the form of coke. Gaseous reducing agents, for example carbon monoxide, may be used if desired.

Where the halogenation is carried out in a fluidized bed, the zirconia-silica material should of course be in the form of particles whose diameters are such that they are suitable for fluidization. Such diameters might be 50 microns to 2000 microns, preferably 75 microns to 250 microns. If carbon is the reducing agent, it too should be in the form of fluidizable particles. Owing to the lower density of the carbon particles when compared with the zirconia-silica particles, the former are preferably larger than the latter; the diameter of the carbon particles should preferably be at least twice that of the zirconia-silica particles. If the process is to be carried out continuously, a supply of further zirconia-silica and carbon particles should of course be provided to the fluidized bed. These are conveniently supplied continuously and at a controlled rate, either separately or as an appropriate mixture.

It is desirable that the amount of the alkali metal halide should be in the range of 0.1% to 5%, preferably 0.5% to 2%, by weight of the total zirconia-silica material and reducing agent.

The introduction of the alkali metal halide into the reaction zone may be effected in various ways. One way is to treat the zirconia-silica material with a solution of the halide, and then the resulting mixture may be dried. Another way is to feed the halide as a particulate solid into a feed of halogen introduced into the reaction zone; this may be particularly suitable where the halogenation is carried out in a fluidized bed.

A third way is to use a two-limbed fluidized bed reactor, such as that described in our British specification No. 835,439; in this case, the zirconia-silica material, reducing agent, and alkali metal halide are supplied to a fluidized bed reactor through a conduit having a downward limb followed by an upward limb, the latter communicating with the fluidized bed reactor. A fluidizing gas is passed into the particulate material in this device and the level of the material in the downward limb is kept above that of the material in the upward limb. In this case, the zirconia-silica material, the reducing agent, and the solid halide may be introduced separately into the device in the desired proportions.

It is possible that the alkali metal halide can be formed in situ, for example by the addition to the zirconia-silica material of an alkali metal or a compound thereof (e.g. potassium carbonate) which is halogenated by the halogenating agent for the zirconia-silica material, for example chlorine. The alkali metal or compound thereof may be added in an impure form containing a high proportion of such metal or compound, for example it may be added as a slag.

The temperature at which the halogenation process is operated is suitably in the range of 900° C. to 1400° C., preferably 1050° C. to 1150° C.

It may be difficult to maintain such temperatures autothermally. If autothermal operation is not obtained, the additional heat required may be provided by supplying carbon or other reducing agent in excess of at least that required to reduce the zircon and burning this material in a controlled amount of oxygen or air admitted to the reactor.

Other materials may be supplied to the reactor to provide heat to maintain the reaction, and such materials may suitably be materials which react highly exothermically with the halogen. It is preferred that such materials do not, under the conditions in the reactor, form gaseous products which would contaminate the zirconium tetrahalide and silicon tetrahalide produced in the reactor. Examples of suitable materials are silicon carbide, zirconium carbide and ferrosilicon. Additional heat may also be supplied from external sources, for example by pre-heating the halogen and/or other gases fed into the reactor, or by electrically heating the reactor, for example by means of an electric furnace outside the reactor, or by preheating the zirconia-silica material before it is introduced into the reactor.

Where a fluidized bed is used it is, of course, essential that fluidizing gas be admitted to the lower part of the bed at a sufficient rate to maintain the bed in a fluidized condition. This may be done by admitting the halogen at a sufficiently high rate or by admitting the halogen with another gas (which may be preheated), the combined rate of admission being sufficient to maintain the fluidization of the bed.

The gases are preferably admitted to the bed through a base plate having a number of apertures, the width of these apertures and the rate of gas flow being such that the pressure drop across the apertures is at least half the pressure drop through the bed when the latter is fluidized, most preferably these two pressure drops are approximately equal.

The gases leaving the bed are conveniently passed through a separator such as a cyclone, to remove any entrained particles and are then cooled to condense the tetrahalides. The zirconium tetrahalide condenses first (at a temperature in the range of about 275° C. to about 150° C.) and this may be collected. The silicon tetrahalide may then be condensed, for example at a temperature in the range of about 20° C. to about −20° C., from the remaining gas. The condensed tetrahalides may then be purified by any suitable method, for example by distillation.

The following example describes an embodiment of the present invention.

*Example*

A 2″ diameter tube having a gas-permeable base plate at its lower end was set up vertically surrounded by an electric furnace.

In the tube above the base plate was formed a bed containing 22 grams of potassium chloride and 2250 grams of a mixture of zircon (particle size −20+200 B.S.S.) and coke (particle size −60+100 B.S.S.) in weight ratio zircon: ::7:3.

The resulting mixture was heated and chlorine was passed through the base plate at a rate of 3 litres per minute. This fluidized the bed. The temperature of the fluidized bed was maintained at about 1180° C. by the heat of reaction and the electric furnace.

The amounts of zirconium tetrachloride and silicon tetrachloride formed were estimated. It was found that 98% of the chlorine admitted to the bed reacted rapidly to give a mixture of zirconium tetrachloride and silicon tetrachloride.

As a contrast to the example, a process similar to that of the example was carried out, in the absence of potassium chloride. In this case, only 85% of the chlorine admitted into the bed reacted to form zirconium tetrachloride and silicon tetrachloride.

What is claimed is:

1. A process for the production of zirconium and silicon tetrachlorides which comprises
    (a) forming in a reaction zone a bed of finely divided zircon and solid reducing agent comprising carbon, the amount of reducing agent being at least that required to reduce the zircon;
    (b) introducing into said bed an alkali metal material selected from the group consisting of alkali metal bromides, alkali metal chlorides, alkali metal iodides and substances adapted to form the alkali metal halide in situ and selected from the group consisting of alkali metal carbonates and alkali metals, the amount of the alkali metal halide in the bed being in the range of 0.1% to 5% by weight of the aggregative amount of zircon and reducing agent;
    (c) passing a fluidizing gas comprising chlorine into the aforesaid bed to fluidize the same;
    (d) heating the fluidized bed to a temperature in the range of 900° C. to 1400° C. for effecting chlorination of the zircon to form zirconium tetrachloride and silicon tetrachloride vapors; and
    (e) removing said vapors from the reaction zone and selectively condensing the zirconium tetrachloride and silicon tetrachloride.

2. A process in accordance with claim 1 wherein the alkali metal portion of said selected alkali metal material is potassium.

3. A process in accordance with claim 2 wherein said selected alkali metal material is a halide.

4. A process in accordance with claim 1 wherein said selected alkali metal material is potassium carbonate.

5. A process in accordance with claim 1 wherein said selected alkali metal material is potassium chloride.

6. A method in accordance with claim 1 wherein said selected alkali metal material is introduced in an amount in the range of 0.5% to 2% by weight of the aggregative amount of zircon and reducing agent.

7. A method in accordance with claim 3 wherein said selected alkali metal material is introduced in an amount in the range of 0.5% to 2% by weight of the aggregative amount of zircon and reducing agent.

8. A method in accordance with claim 5 wherein said selected alkali metal material is introduced in an amount in the range of 0.5% to 2% by weight of the aggregative amount of zircon and reducing agent.

References Cited by the Examiner

UNITED STATES PATENTS

| 2,701,180 | 2/1955 | Krchma | 23—87 |
| 2,914,379 | 11/1959 | Forman | 23—87 |
| 2,940,826 | 6/1960 | Andersen | 23—87 |
| 2,952,513 | 9/1960 | Wigton | 23—87 |
| 3,050,362 | 8/1962 | Oppegaard et al. | 23—87 |

FOREIGN PATENTS

| 1,056,098 | 4/1959 | Germany. |
| 793,642 | 4/1958 | Great Britain. |

OTHER REFERENCES

H. Remy, Treatise On Inorganic Chemistry, volume II, 1956, pages 67, 71, 75, Elsevier Publishing Co., N.Y.

OSCAR R. VERTIZ, *Primary Examiner.*

MAURICE A. BRINDISI, B. H. LEVENSON,
*Assistant Examiners.*